United States Patent
Udall et al.

(10) Patent No.: US 9,039,376 B2
(45) Date of Patent: May 26, 2015

(54) SUPPORT RING FOR A ROTARY ASSEMBLY

(71) Applicant: ROLLS-ROYCE PLC, London (GB)

(72) Inventors: Kenneth Franklin Udall, Kirk Hallam (GB); Kenneth John Mackie, Derby (GB)

(73) Assignee: ROLLS-ROYCE plc, London (GB)

( * ) Notice: Subject to any disclaimer, the term of this patent is extended or adjusted under 35 U.S.C. 154(b) by 672 days.

(21) Appl. No.: 13/653,780

(22) Filed: Oct. 17, 2012

(65) Prior Publication Data

US 2013/0101434 A1     Apr. 25, 2013

(30) Foreign Application Priority Data

Oct. 25, 2011 (GB) .................................. 1118386.0

(51) Int. Cl.
*B64C 11/06* (2006.01)
*F01D 5/30* (2006.01)
*B64D 27/00* (2006.01)

(52) U.S. Cl.
CPC .............. *B64C 11/06* (2013.01); *F01D 5/3023* (2013.01); *F05D 2260/94* (2013.01); *B64D 2027/005* (2013.01); *Y02T 50/66* (2013.01)

(58) Field of Classification Search
CPC ... F01D 5/023; F01D 5/3023; F05D 2260/94; B64C 11/04; B64C 11/06
See application file for complete search history.

(56) References Cited

U.S. PATENT DOCUMENTS

| | | | |
|---|---|---|---|
| 4,082,378 A | | 4/1978 | Gries |
| 4,762,466 A | * | 8/1988 | Bouiller et al. ................ 416/205 |
| 4,863,352 A | * | 9/1989 | Hauser et al. .............. 416/204 R |
| 5,108,259 A | * | 4/1992 | Wakeman et al. ............ 416/135 |
| 5,169,289 A | | 12/1992 | Lalanne |
| 2003/0143078 A1 | | 7/2003 | Benedetto et al. |
| 2010/0190596 A1 | | 7/2010 | Wills |
| 2010/0239421 A1 | * | 9/2010 | Boston et al. .................. 416/136 |

FOREIGN PATENT DOCUMENTS

| | | |
|---|---|---|
| FR | 2 953 486 A1 | 6/2011 |
| GB | 1195964 | 6/1970 |
| GB | 2 038 445 A | 7/1980 |
| WO | WO 2011/000943 A1 | 1/2011 |
| WO | WO 2011/069981 A1 | 6/2011 |

OTHER PUBLICATIONS

Feb. 21, 2012 Search Report issued in Great Britain Application No. 1118386.0.

* cited by examiner

*Primary Examiner* — Ninh H Nguyen
(74) *Attorney, Agent, or Firm* — Oliff PLC

(57) ABSTRACT

A support ring for a rotary assembly such as a propeller assembly includes support cups for receiving blade roots of propeller blades. The support cups are interconnected by bridging structures. Each bridging structure includes bridging walls which extend radially from a bridging web. The bridging structures thus have a channel-shaped cross-section. The bridging walls have a scalloped configuration at their radially outer edges. As a result of this configuration, the neutral axes of the bridging structures are straight, so that the support ring behaves, in structural terms, as a polygon.

15 Claims, 2 Drawing Sheets

SUPPORT RING FOR A ROTARY ASSEMBLY

This invention relates to a support ring for a rotary assembly, and is particularly, although not exclusively, concerned with a support ring for a bladed rotary assembly, such as a propeller assembly to be driven by a gas turbine engine.

Open rotor propulsion units are known which comprise a gas turbine engine driving a propeller assembly situated aft of the engine. It is important that the hot exhaust gases from the gas turbine engine are ducted in such a way that components of the propeller assemblies are not degraded. For this purpose, it has been proposed, for example in WO2011/000943, to support the propellers in a support ring which extends around the exhaust gas flow path of the engine. The blades are supported by the support ring in a manner which enables them to rotate about their lengthwise axes for pitch control purposes. The support ring is driven from the engine to rotate the propeller assembly.

The support ring disclosed in WO2011/000943 has a relatively large diameter and a small radial depth. This geometry results in a component which is relatively flexible in the hoop bending (ovalisation) direction, and this is undesirable from the point of view of the stability of the propeller assembly as a whole, particularly in extreme loading conditions, such as can result from damage to, or loss of, one of the blades.

According to the present invention there is provided a support ring for a rotary assembly, the support ring comprising a ring body having a circumferential array of support cups interconnected by bridging structures, the support cups opening at a radially outer face of the support ring, and each bridging structure having a channel-shaped cross-section comprising axially spaced apart bridging walls which extend outwardly, with respect to the ring axis, from a bridging web.

Each bridging structure may be configured so that it has a substantially straight neutral axis in the hoop direction. As a result, the support ring behaves structurally as a polygon, with the support cups at the corners of the polygon. The straight neutral axis may be achieved, for example, by appropriate profiling of the bridging walls. For example the bridging walls may have radially outer edges which are concavely curved as viewed along the ring axis. The bridging walls may adjoin the respective support cups over substantially the full radial height of the support cups.

Each support cup may have a substantially circular cross-section, in which case the bridging walls may extend substantially tangentially to side walls of the respective support cups.

Each support cup may have a radially inner end wall. The radially inner end wall may lie substantially in the same circumferential plane as the bridging webs. Each radially inner end wall may have a central aperture, and the radially inner end wall may have an increased thickness in the region surrounding the aperture.

The support ring may have a circumferential drive flange extending axially outwardly of the ring body. The drive flange may have apertures, for example to permit air flow across the drive flange, and the apertures may be situated at the same angular positions as the support cups. A circumferential catcher drive flange may be provided which extends axially or radially of the ring body to a clearance attachment.

Bracing webs may be provided between the bridging walls of each bridging structure, in order to enhance the torsional strength of the bridging structures. The bracing webs may intersect or connect to the cups at or between the bridging walls for more even cup support. An alternative, or additional, measure to stiffen the ring under torsion and under hoop bending is to configure the bridging wall so that it has an increased axial rim length, extending axially beyond the support cups.

In one embodiment, the support ring comprises a blade support ring for a propeller assembly, in which case blades of the assembly may be supported within the support cups.

The present invention also provides a gas turbine engine provided with a propeller assembly having a support ring as defined above, the exhaust gas flow path of the gas turbine engine extending through the support ring.

For a better understanding of the present invention, and to show more clearly how it may be carried into effect, reference will now be made, by way of example, to the accompanying drawings, in which.

Figure 1:
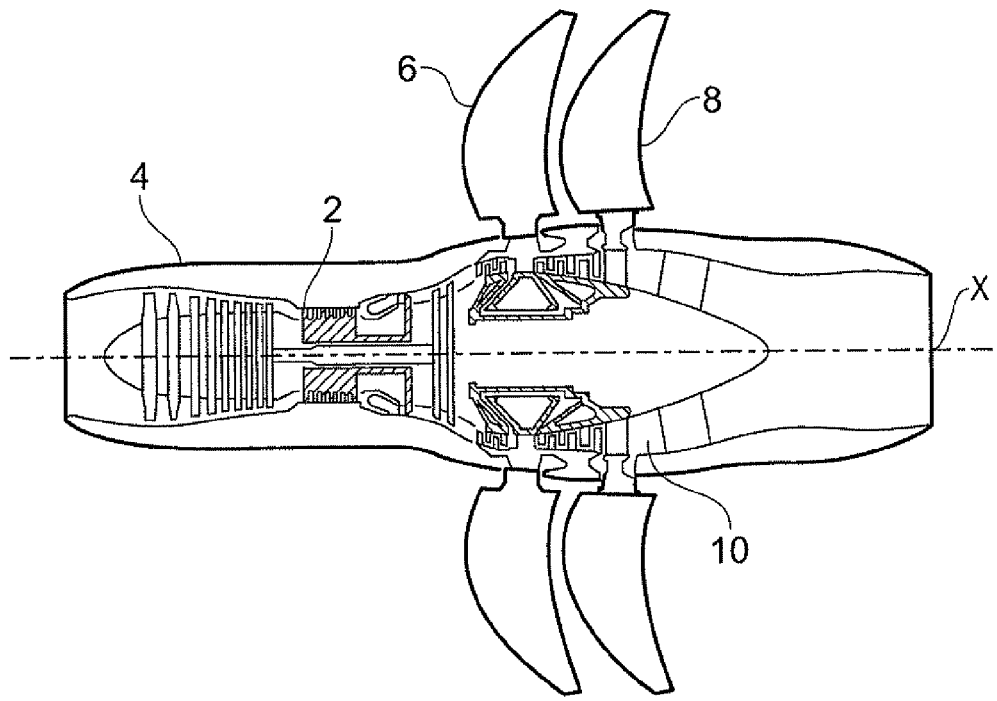
FIG. 1 is a schematic side view of an open rotor propulsion unit.

The propulsion unit shown in FIG. 1 comprises a core gas turbine engine 2 supported within a nacelle 4. Propeller assemblies 6 and 8 are mounted aft of, and driven by, the gas turbine engine 2 about the engine axis X. An annular exhaust gas flow duct 10 extends from the engine 2 to emerge aft of the propeller assemblies 6, 8.

Figure 2:
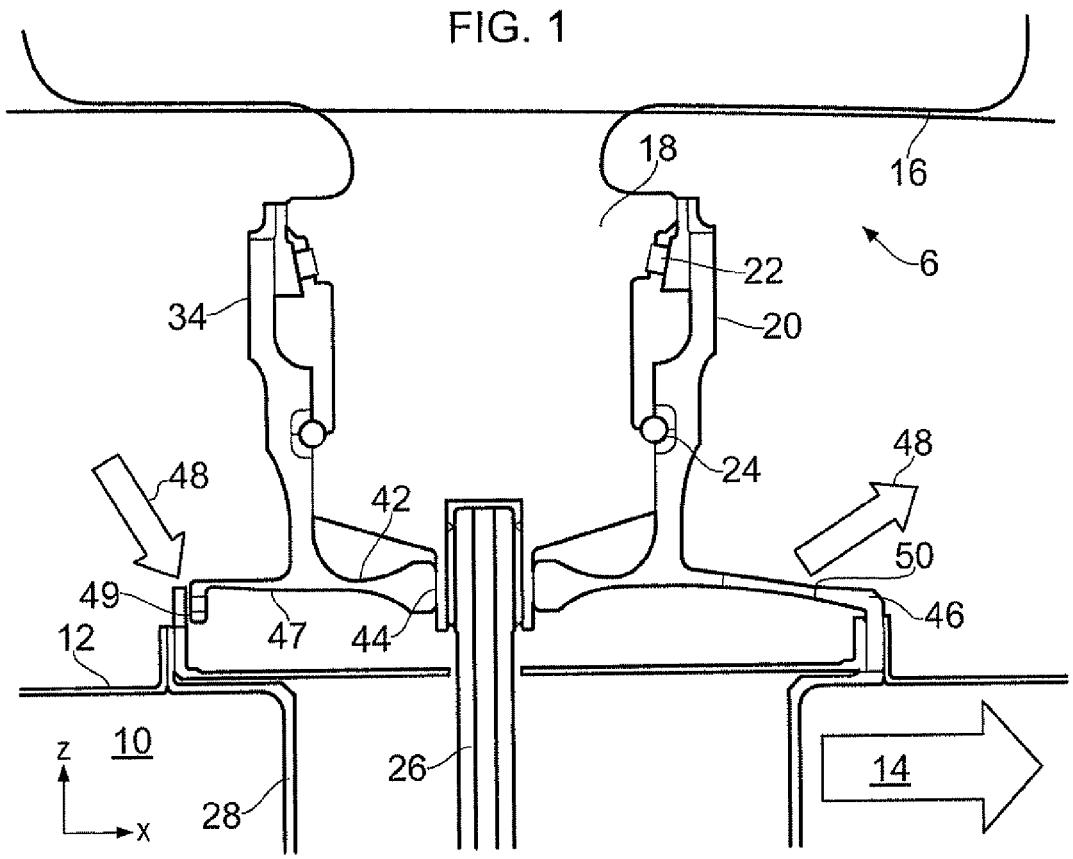
FIG. 2 is a sectional view of a support structure for a blade of the propulsion unit of FIG. 1.

The exhaust duct 10 is shown in FIG. 2, and is defined at its radially outer periphery by a rotating hollow shaft assembly 12. The exhaust gas flow in the duct 10 is represented by an arrow 14.

FIG. 2 also shows a blade 16 of the propeller assembly 6. A blade root 18 of the blade 16 is received in a support cup 20, where it is supported for rotation about the lengthwise axis of the blade 16 by bearings 22, 24. The figure shows a typical bearing arrangement, but other bearing arrangements are feasible. A pitch control shaft 26 extends across the duct 10 within a shroud 28 to transfer rotation from a pitch control mechanism (not shown) to the blade 16.

Figure 3:
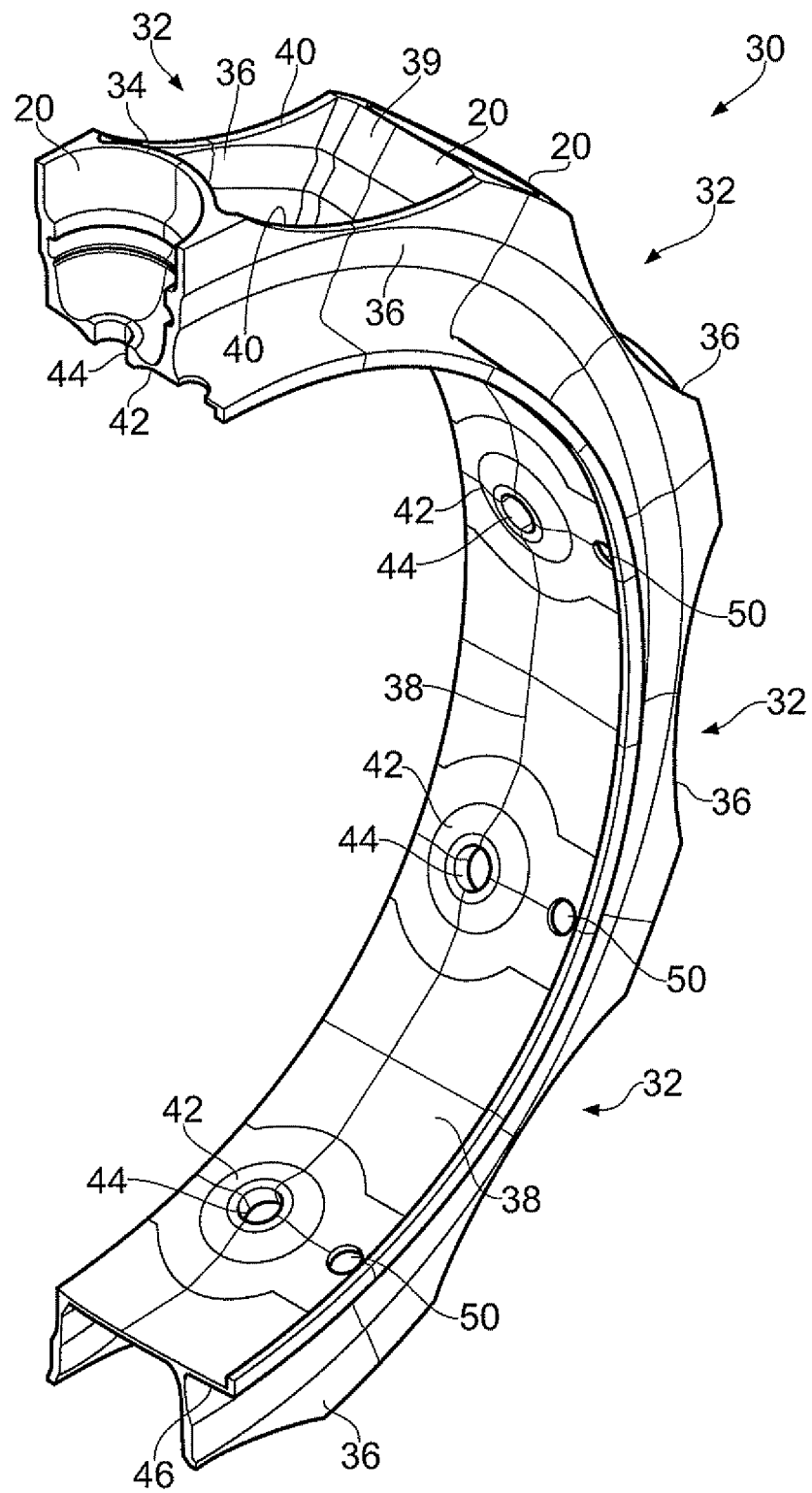
FIG. 3 is a partial isometric view of a support ring of the support structure of FIG. 2.

The support cup 20 is one of a plurality of such cups, one for each blade 16, provided in a support ring 30 shown in FIG. 3. It will be appreciated that the support cups 20 are disposed in a circumferential array about the support ring 30 and are interconnected by bridging structures 32. The axis of the support ring 30 coincides with the engine axis X.

Each support cup comprises a side wall 34 which is circular in cross-section. The interior surface of the side wall 34 is profiled in order to accommodate the bearings 22, 24, and the geometry of the side wall 34 is otherwise configured in order to provide adequate rigidity to support the blade 16 in a stable manner.

Each bridging structure 32 has a generally channel-shaped cross-section, as viewed in a plane extending axially and radially with respect to the central axis of the support ring 30. Each bridging structure 32 thus comprises two axially spaced apart bridging walls 36 which extend radially outwardly from a bridging web 38. The side walls 34 of the support cups 20 extend fully between the bridging walls 36 and adjoin them. The bridging structures thus define "pockets" 39 which, like the support cups 20, are open at the radially outer face of the support ring 30.

Each bridging wall 36 adjoins the side walls 34 of the support cups 20 at each circumferential end over the full radial depth of the support cups 20. However, between the support cups 20, the radially outer edges 40 of the bridging walls 36 are concavely curved, as viewed along the axis of the support ring 30, so that they have a "scalloped" form. As a result of this configuration, each bridging structure 32 has a substantially straight neutral axis in the hoop direction and so behaves, in tension, like a straight strut. In structural terms, therefore, the support ring 30 is equivalent to a polygon, with the support cups 20 interconnected by straight links afforded by the bridging structures 32.

Each support cup 20 has a radially inner end wall 42 provided with a central aperture 44 through which extends the pitch control shaft 26 (FIG. 2). It will be appreciated from FIGS. 2 and 3 that, in the region of the central aperture 44, the wall thickness of the radially inner end wall 42 is increased to reduce the hoop stress peak generated at the aperture 44.

The radially inner end walls 42 of the support cups 20 lie in the same circumferential plane as the bridging webs 38 so as to provide a substantially continuous inner surface for the ring body constituted by the support cups 20 and the bridging structures 32.

As shown in FIG. 2, the support ring 30 is provided with a drive flange 46 which extends generally axially from the ring body constituted by the support cups 20 and the bridging structures 32. The drive flange 46 is bolted to the shaft assembly 12 to transmit rotation from the shaft assembly 12 to the propeller assembly 6, 8. Also shown is an optional catcher drive arm 47 (which may take the form of any suitable member such as a flange), which extends axially (or alternatively radially) from the ring body and is coupled to the shaft assembly 12 by a clearance joint 49 which includes a nut and bolt assembly (not shown). The catcher drive arm 47 acts to strengthen the assembly and retains the support ring 30 in the event of a mechanical failure of the drive flange 46, for example. The clearance joint 49 avoids thermal fight with the shaft assembly, but offers a secondary loadpath in the event of failure of the first drive arm, or of the hub.

It will be appreciated that the drive flange 46 provides a path for the conduction of heat from the exhaust gas flowing in the duct 10 to the ring body, and in particular to the bearings 22, 24. In order to minimise this heat transfer, cooling air is directed, as indicated by arrows 48, between the support ring 30 and the shaft assembly 12. To enable this flow, cooling holes 50 are provided in the drive flange 46 and, as shown in FIG. 3, these cooling holes may be positioned at the same angular locations as the support cups 20. The cooling holes 50 thus provide a thermal barrier to heat flow to the support cups 20.

It will be appreciated from FIG. 3 that the outside profile of the bridging walls 36 follows the profile of the outer surface of the side walls 34 of the support cups 20. This provides surface continuity in the hoop direction. This exterior profile of the bridging walls 36 is followed on the interior surface of the bridging walls, in order to achieve an efficient side wall profile.

It will be appreciated that various changes may be made to the configuration shown in FIGS. 2 and 3 in order to take account of expected loads on the support ring 30. Thus, wall sections and profiles may be varied. In particular, the reinforcing thickness of the radially inner end wall of the support cups 20 adjacent the central aperture 44 need not be axisymmetric, as shown in the Figures. Also, additional stiffening measures may be incorporated, such as cross bracing in the pockets 39 defined by the bracing structures 32 between the support cups 20.

The channel section ring 30 connects the full radial depth of the bearing support cups 20 for maximum hoop, and hoop bending, stiffness. The scalloping of the edges 40 of the bridging walls 36 turns a basic circular form into a polygonal ring, which is more efficient at carrying the dominant local blade loading. The radial inner end wall 42 provides a floor of the support cup 20 and so stiffens it efficiently, and minimises the hoop carrying material radius. The polygonised inter-cup floor provided by the bridging web 38 efficiently completes the hoop load path. At the bridging walls 36 the webs 38 may follow a circular profile, but transition to a straight profile in the central region to give a polygonised loadpath in the thin web 38. The open top form is compatible with the blade space requirements, and gives good machining and inspection access, whilst the relatively low torsional stiffness of a thin open channel section ring beam is enhanced by the channel section flexural centre being directed by the shear flows to a position radially inboard of the ring base, minimising the ring free torsional length. The drive flange 46 contributes to the torsional stiffness. The drive flange 46 thermally isolates the body of the ring 30 from the hot gas stream 14, enabling the ring 30 to be made in titanium alloy for low weight and low thermal expansion and good fatigue properties at the operating temperature. Other materials such as steel or aluminium could also be used with sufficient thermal isolation. The local reinforcement around the aperture 44 reduces peak stresses.

The efficient hoop load paths and low density material for the ring 30 save significant weight. The thermal isolation provided by the drive flange 46 and the cooling air flow 48 minimises thermal fights which might otherwise arise owing to the close proximity of the hot gas stream. It also protects the bearings 22, 24, their lubrication, and the blade roots 18 (which may be made from a composite material), from excessive temperature. The radial depth of the support ring 30 enhances the hoop bending stiffness and therefore provides improved integrity in the event of blade failure or other extreme load conditions.

Should further torsional stiffness be needed, whilst retaining an open topped machinable form, then the scalloping at the edges 40 could be reduced but made more effective by increasing the local axial length (i.e. thickness) of the bridging walls 36 in the region of the edges 40. This would stiffen the rim under torsion, and under hoop bending.

Alternately, radial view X bracing could be introduced into the pockets 39 formed by the bridging structures 32, to triangulate the existing open rectangular space. The bracing webs may connect to the cups 20 between the bridging walls 36 for more even cup support. The support cups 20 themselves are stiffened by the transition material at their junctions with the bridging walls 36, and by the presence of the bearings 22, 24 and the blade root or hub 18, giving a cup circle radial load path under bearing preloading and blade load.

Local thinning of material thicknesses or lightening holes positioned selectively in low stress regions of the support ring 30, for example in the bridging web 38 could be applied as means of reducing weight.

Although the present invention has been described with reference to an open rotor "pusher" propulsion unit, a support ring as described with reference to FIGS. 2 and 3 could be employed in other propulsion unit configurations, such as "puller" units and turboprop engines. Furthermore, the principles underlying the present invention can be applied to any large diameter but radially shallow rotating hub structure with a relatively low blade count, such as a wind or water turbine, an aircraft or ship propeller or an office or air conditioning fan.

The invention claimed is:

1. A support ring for a rotary assembly, the support ring comprising a ring body having a circumferential array of support cups interconnected by bridging structures, the support cups opening at a radially outer face of the support ring and each bridging structure having a channel-shaped cross-section comprising axially spaced apart bridging walls which extend outwardly, with respect to the ring axis, from a bridging web, wherein each support cup has a radially inner end wall which lies substantially in the same circumferential plane as the bridging webs.

2. A support ring as claimed in claim 1, in which each bridging structure has a substantially straight neutral axis in the hoop direction of the ring, whereby the ring forms a polygonal structure.

3. A support ring as claimed in claim 2, in which the bridging walls have radially outer edges which are concavely curved as viewed along the axis of the support ring.

4. A support ring as claimed in claim 1, in which the bridging walls adjoin the support cups over substantially the full radial height of the support cups.

5. A support ring as claimed in claim 1, in which each support cup has a substantially circular cross-section and the bridging walls extend substantially tangentially to side walls of the support cups.

6. A support ring as claimed in claim 1, in which the radially inner end wall has a central aperture.

7. A support ring as claimed in claim 1, in which the radially inner end wall has a region of increased thickness surrounding the aperture.

8. A support ring as claimed in claim 1, in which a circumferential drive flange extends axially outwardly of the ring body.

9. A support ring as claimed in claim 8, in which apertures are provided in the drive flange.

10. A support ring as claimed in claim 9, in which the apertures are situated at the same angular positions as the support cups.

11. A support ring as claimed in claim 8, in which a circumferential catcher drive flange is provided which extends axially or radially of the ring body to a clearance attachment.

12. A support ring as claimed in claim 1, in which bracing webs extend between the bridging walls of each bridging structure.

13. A support ring as claimed in claim 12, in which the bracing webs intersect the support cups at or between the bridging walls.

14. A support ring as claimed in claim 1, in which the bridging structure has reduced thickness or apertures at regions of low stress.

15. A propeller assembly comprising a support ring in accordance with claim 1.

* * * * *